United States Patent
Huang et al.

(10) Patent No.: US 12,438,723 B2
(45) Date of Patent: Oct. 7, 2025

(54) SYSTEMS AND METHODS OF IDENTITY AUTHENTICATION USING A CUSTOM VISUAL CODE

(71) Applicant: Wells Fargo Bank, N.A., San Francisco, CA (US)

(72) Inventors: Jason Huang, San Francisco, CA (US); Dennis E. Montenegro, Concord, CA (US); Sadie S. Salim, Mill Valley, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 183 days.

(21) Appl. No.: 18/321,375

(22) Filed: May 22, 2023

(65) Prior Publication Data

US 2024/0396733 A1    Nov. 28, 2024

(51) Int. Cl.
  *H04L 9/32*    (2006.01)
  *G06K 7/14*    (2006.01)
  *H04L 9/08*    (2006.01)

(52) U.S. Cl.
  CPC .......... *H04L 9/3231* (2013.01); *G06K 7/1413* (2013.01); *H04L 9/0863* (2013.01); *H04L 9/0866* (2013.01)

(58) Field of Classification Search
  CPC ... H04L 9/3231; H04L 9/0863; H04L 9/0866; G06K 7/1413
  USPC ........................................................ 713/168
  See application file for complete search history.

(56) References Cited

U.S. PATENT DOCUMENTS

| | | | |
|---|---|---|---|
| 7,784,684 B2 * | 8/2010 | Labrou | G06Q 20/327 705/64 |
| 11,138,304 B2 * | 10/2021 | Osborn | G06F 21/34 |
| 11,216,827 B2 * | 1/2022 | Budano | G06K 7/1413 |
| 11,995,596 B2 * | 5/2024 | Loreto | H04L 63/102 |
| 2016/0379211 A1 * | 12/2016 | Hoyos | H04L 63/0861 705/75 |
| 2017/0264608 A1 * | 9/2017 | Moore | G07C 9/257 |

(Continued)

FOREIGN PATENT DOCUMENTS

| WO | 2021133501 A1 | 7/2021 |
|---|---|---|
| WO | 2021236612 A1 | 11/2021 |

OTHER PUBLICATIONS

"Lincoln in Dalivision," Wikipedia, Believed to be published at least as early as Aug. 27, 2012, Available online at: https://en.wikipedia.org/wiki/Lincoln_in_Dalivision, 3 pages.

(Continued)

*Primary Examiner* — Thanh T Le
(74) *Attorney, Agent, or Firm* — Kilpatrick Townsend & Stockton LLP (57) ABSTRACT

Systems and methods for authenticating user identity using custom visual code is disclosed. One disclosed method includes determining user identification information based on received biometric data; generating a temporary one-time password; encrypting the user identification information and the temporary one-time password; and generating a visual code based in part on the encrypted temporary one-time password and user identification information. The method may further include generating a prompt requesting a passcode or biometric data when a user device is within a predetermined threshold range of an authenticating device.

20 Claims, 5 Drawing Sheets

(56) References Cited

U.S. PATENT DOCUMENTS

| | | | | |
|---|---|---|---|---|
| 2018/0007060 | A1* | 1/2018 | Leblang | H04L 63/107 |
| 2019/0114617 | A1* | 4/2019 | Hay | G06Q 20/40145 |
| 2019/0342102 | A1* | 11/2019 | Hao | H04L 9/3247 |
| 2020/0090161 | A1* | 3/2020 | Hay | G06K 7/1413 |
| 2021/0334341 | A1* | 10/2021 | Roberts | G06F 21/105 |
| 2022/0067740 | A1* | 3/2022 | Patel | G06F 21/44 |
| 2023/0198961 | A1* | 6/2023 | Watanabe | H04L 9/40 |
| | | | | 713/171 |
| 2024/0119439 | A1* | 4/2024 | Phillips | G07F 19/206 |
| 2024/0354385 | A1* | 10/2024 | Gatlin | G06K 19/06037 |

OTHER PUBLICATIONS

"Artwork Details: Title: Gala Contemplating the Mediterranean Sea which at Twenty Meters Becomes the Portrait of Abraham Lincoln-Homage to Rothko (Second Version)," Salvador Dali Museum, Inc., Believed to be published at least as early as 2022, Available online at: http://archive.thedali.org/mwebcgi/mweb.exe?request=record%3Bid%3D152%3Btype%3D101, 3 pages.

Garateguy et al., "QR Images: Optimized Image Embedding in QR Codes," IEEE Transactions on Image Processing, Jul. 2014, pp. 2842-2853, vol. 23, No. 7, IEEE.

Makse, "Friend or Faux," Believed to be published at least as early as Jan. 26, 2014, Available online at: http://www.stevenmakse.com/art/friend%20or%20faux.html, 11 pages.

Eli, "ImageHash—Easy Steganography," Medium, Dec. 22, 2013, Available online at: https://elisklar.medium.com/imagehash-easy-steganography-240b92b586e2, 16 pages.

"Fingerprint Smart Card: 1.02 Inch Ink Screen Fingerprint Smart Cards 7816 Interface Chargeable," Believed to be published at least as early as 2021, China Good Quality OTP Smart Card Supplier, Available online at: https://www.ptpsmartcard.com/sale-14415629-1-02-inch-ink-screen-fingerprint-smart-cards-7816-interface-chargeable.html, 3 pages.

"How do rsa key fobs work?," Stack Overflow, Believed to be published at least as early as 2009, Available online at: https://stackoverflow.com/questions/512985/how-do-rsa-key-fobs-work, Stack Exchange Inc., 2 pages.

"Time-based one-time password," Wikipedia, Believed to be published at least as early as Nov. 3, 2009, Available online at: https://en.wikipedia.org/wiki/Time-based_one-time_password, 3 pages.

"Fiducial Marker," Wikipedia, Believed to be published at least as early as Aug. 17, 2006, Available online at: https://en.wikipedia.org/wiki/Fiducial_marker, 6 pages.

Kaspersky, "What is steganography? Definition and explanation," Believed to be published at least as early as Mar. 7, 2023 Kaspersky Lab, Available online at: https://www.kaspersky.com/resource-center/definitions/what-is-steganography, 10 pages.

* cited by examiner

```
┌─────────────────────────────────────────┐
│ Identifying device within a threshold distance │
│                                     402 │
└─────────────────────────────────────────┘
                    ↓
┌─────────────────────────────────────────┐
│           Generating a prompt           │
│                                     404 │
└─────────────────────────────────────────┘
                    ↓
┌─────────────────────────────────────────┐
│          Receiving biometric data       │
│                                     406 │
└─────────────────────────────────────────┘
                    ↓
┌─────────────────────────────────────────┐
│         Authenticating user identity    │
│                                     408 │
└─────────────────────────────────────────┘
                    ↓
┌─────────────────────────────────────────┐
│    Receiving user identification information │
│                                     410 │
└─────────────────────────────────────────┘
                    ↓
              ╲ To Fig. 4B ╱
```

From Fig. 4A

Generating a temporary one-time password
412

Hashing a string
414

Generating a QR code
416

Transmitting a transaction request
418

*FIG. 4B*

SYSTEMS AND METHODS OF IDENTITY AUTHENTICATION USING A CUSTOM VISUAL CODE

FIELD OF INVENTION

The present disclosure generally relates to authenticating user identity and more particularly to systems and methods for authenticating user identity with a custom visual code generated using information associated with the user.

BACKGROUND

Multi-factor authentication provides users additional protection against malicious hackers as compared to standard passwords and usernames. Systems using multi-factor authentication require the would-be hacker to gain access to the user's device or to a third-party application in addition to gaining access to the user's login credentials. Because most attempted hacks lack access to a user's device, multi-factor authentication generally provides ample protection against most hacks. Current multi-factor authentication applications force users to take several additional actions before users can execute their desired task. For example, users often must enter a username and password pair into a third-party application, wait for the third-party application to send an alphanumeric code, and then enter the alphanumeric code into an application. These additional actions introduce friction to the applications. This is especially problematic for applications used for transactions. The more steps a user must take to conduct a transaction, the less likely the user will follow through with the transaction.

SUMMARY

According to certain embodiments, a method for authenticating user identity using a custom visual code comprises: determining user identification information based on received biometric data; generating a temporary one-time password; encrypting the user identification information and the temporary one-time password; and generating a visual code based in part on the encrypted temporary one-time password and user identification information. According to further embodiments, the method for authenticating user identity using custom visual code further comprises: generating a prompt requesting the passcode or biometric data when a user device is within a predetermined threshold range of an authenticating device.

According to another embodiment, a non-transitory computer readable medium may comprise program code, which when executed by one or more processors, causes the one or more processors to: determine user identification information based on received biometric data; generate a temporary one-time password; encrypt the user identification information and the temporary one-time password; and generate a visual code based in part on the encrypted temporary one-time password and user identification information. According to further embodiments, the non-transitory computer readable medium may further comprise program code for generating a prompt requesting the passcode or biometric data when within a predetermined threshold range of an authenticating device.

According to another embodiment, a system for authenticating user identity using a custom visual code may comprise: one or more processors; and memory that stores instructions that, when executed by the one or more processors, cause the one or more processors to: determine user identification information based on received biometric data; generate a temporary one-time password; encrypt the user identification information and the temporary one-time password; and generate a visual code based in part on the encrypted temporary one-time password and user identification information. According to further embodiments, the system may further comprise: generating a prompt requesting the passcode or biometric data when within a predetermined threshold range of an authenticating device.

DETAILED DESCRIPTION

Reference will now be made in detail to various and alternative illustrative examples and to the accompanying drawings. Each example is provided by way of explanation, and not as a limitation. It will be apparent to those skilled in the art that modifications and variations can be made. For instance, features illustrated or described as part of one example may be used on another example to yield a still further example. Thus, it is intended that this disclosure include modifications and variations as come within the scope of the appended claims and their equivalents.

Illustrative Embodiments of Identity Authentication Using Visual Code

In one illustrative embodiment, a system for authenticating user identity using a visual code comprises an application executed on a user device, such as a smartphone, tablet, laptop, smart watch, smart card, or other portable device with a screen. Users may scan the visual code generated by the application on the user device using an authenticating device. The authenticating device may include any device or system that requests authentication of a user's identity to execute an action. Non-limiting examples of authenticating devices includes: an automated teller machine (ATM), a kiosk, a vault, a point-of-sale system, a vending machine, a portable electronic device such as a cell phone or laptop, a turnstile, an employee workstation, and a smart lock for a door.

The user device and the authenticating device may use various wireless technologies such as Bluetooth, WiFi, near-field communication technology (NFC), or a proprietary radio frequency (RF) signal to identify when the two devices are within a predetermined distance of each other. When one or both of the devices detects the other device as being within a predetermined distance, the two devices may exchange communications to update the other of its location or distance. When the application determines that the two devices are within the predetermined distance, the application may generate a prompt for the user. The prompt may request the user confirm that the user would like to authenticate his or her identity. If the user confirms the request, the prompt may further request information from the user such as a passcode, biometric information, or both. For example, when the user device detects the authenticating device as within the predetermined distance (e.g., three feet), the application may generate a prompt or popup message requesting the user to input biometric information, such as by taking a facial scan of the user or scanning the user's fingerprint.

In some examples, both the application executed on the user device and the authenticating device may generate their own respective prompts. In one such example, the user may tap his or her user device equipped with near-field communication (NFC) technology to an authenticating device to generate multiple prompts. For example, the device may be an ATM that communicates with the user device through a wireless connection. When the authenticating device detects a user device in contact with the authenticating device, the authenticating device may generate a prompt requesting confirmation that the user intends to authenticate identity, and the authenticating device may activate a camera or scanner to scan visual code from the user device.

The prompt on the user device may request a passcode to proceed with identity authentication. The passcode may be the user device's unlock passcode, or may be a passcode particular to the application. In some examples, the application may authenticate the user's identity based on both the user's passcode and biometric data of the user. For example, the user device may store the user's fingerprint, palm print, voice recording, or facial scan. The user device may further include a biometric scanner, such as a camera or fingerprint scanner, and the user device may compare detected biometric with stored biometric data to verify the user's identify. When the biometric data matches the stored biometric data, the application may confirm the user's identify. In some embodiments, biometric data may be stored locally. Alternatively, in other embodiments, a database external to the user device may store the biometric data.

When the user's identity is authenticated, the application may generate a temporary one-time password (TOTP). In some examples, a third-party application executed in cloud infrastructure or at separate location of the user device may receive a request from the application to generate the temporary one-time password. For example, the application may communicate with the third-party application to generate the temporary one-time password, which the third-party application may transmit back to the user device. In other examples, the application executed on the user device generates the temporary one-time password itself, without requiring an internet connection or a third-party application.

The application may encrypt the temporary one-time password and user identification information. In some examples, the application encrypts the temporary one-time password and user identification information into an encrypted string. User identification information may include information associated with the user or a user's account such as but not limited to: an Employee Identification Number (EIN), the user's Social Security Number (SSN), the user's username and password pair, the user's bank account and routing numbers, and the user's credit card information.

The application may generate visual code based on the encrypted information, (e.g., a QR code, barcode, or other 2-dimensional or 3-dimensional images). In some examples, the application generates the visual code based on a hashed string including portions of the temporary one-time password and the user identification information. The application may use steganography to encode the hashed string or other encrypted information into the visual code. The authenticating device may then decrypt the encrypted messages encoded into the visual code.

In some examples, the application may use a hashing function on the user identification information and the temporary one-time password to generate a hash value. The user device may then upload the hash value to an online database or repository. The authenticating device may scan the visual code and identify the hash value. The authenticating device may then search the online database or repository for the hash value to authenticate the user's identity.

In further examples, the application may use various steganography techniques to include information in the visual code, such as integrating the encrypted string into an image of the user's face or a company's logo. In some examples, the application may use steganography techniques to add encoded markers, such as encoded messages, to images stored at the user device. The encoded markers may indicate what authentication protocol the authenticating device should use when scanning the image.

The authenticating device may scan the visual code to conduct a transaction or to receive permission to execute another action. For example, the authenticating device may be a point-of-sale system with a camera. The user may hold up the screen of the user device displaying the visual code to the authenticating device's camera or scanner so that the authenticating device scans the visual code. The visual code may include information associated with the user's identity such as his or her debit card number and instructions for the point-of-sale system to withdraw money from the account to conduct a transaction. In other examples, the authenticating device may be a smart lock that remains locked until the user authenticates his or her identity. For example, the authenticating device may be a door entry system, such as a door blocking entry into an employee's workplace. The employee may scan the visual code at the door entry system to gain access to the workplace.

In further examples, the visual code may include additional instructions for the authenticating device in addition to the user identification information and temporary one-time password. For example, the authenticating device may be an ATM. While waiting in a queue to use the ATM, the user may select from the application on the user device how much money to withdraw and from which account to withdraw it. The application may generate a QR code based on the temporary one-time password, the user identification information, and the transaction request so that the user may quickly conduct his or her transaction when it is his or her turn to use the ATM. The user may queue up transactions or actions using visual code so that when the user gains access to an authenticating device, the user may more quickly authenticate the user's identity or conduct a transaction.

In some examples, the visual code may only be valid for a set period of time. For example, the application may use the time and date of the user device in generating the visual code and may generate the visual code to be valid for authenticating devices for a set period after generation, such as for one hour, fifteen minutes, or thirty seconds. In further examples, the user may set the time limit for how long the visual code is valid.

Systems for Authenticating User Identity Using Custom Visual Code

Figure 1:
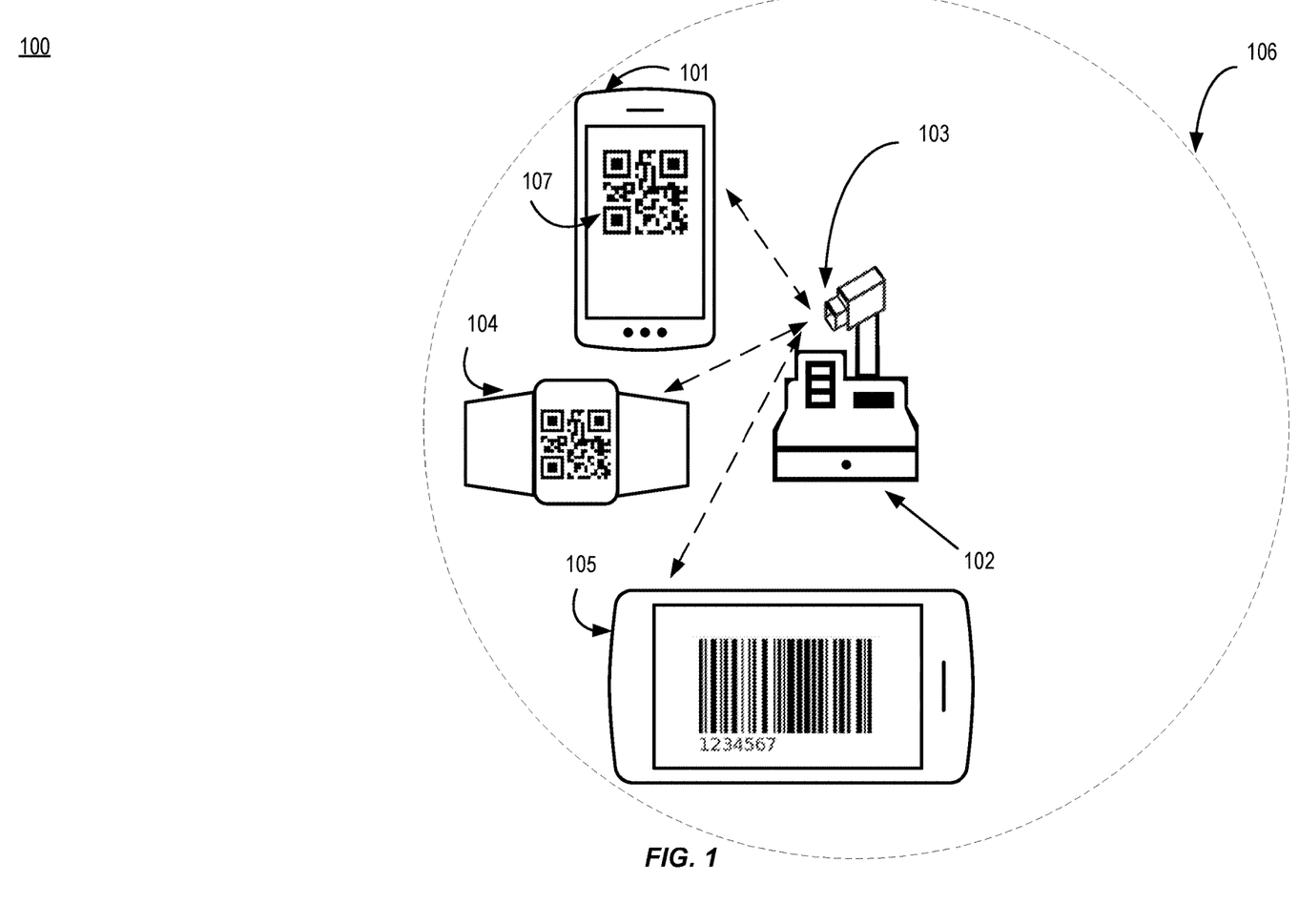
FIG. 1 illustrates an example system for authenticating user identity using a visual code according to one embodiment.

FIG. 1 illustrates a system 100 for authenticating user identity using custom visual code. The system includes one or more user devices 101, 104, and 105, an authenticating device 102, a camera or scanner 103, and custom visual code 107.

As shown in FIG. 1, user devices 101, 104, and 105 may include various devices with a display including but not limited to: a cellphone, smart watch, tablet, laptop, and smart card. The user devices 101, 104, and 105 may execute an application configured to generate the custom visual code 107. By way of example, FIG. 1 shows three different user devices 101, 104, and 105 however the system 100 does not require multiple user devices 101, 104, and 105. Any individual user device 101, 104, or 105 may execute the application.

When the user devices 101, 104, and 105 are within a predetermined distance 106 of the authenticating device 102, the application may generate a prompt for the user to scan the user's biometric data. For example, the prompt may include activating a camera on the user device 101, 104, and 105 and scanning the user's face and comparing the user's face to stored biometric data, such as a facial scan.

In some examples, users of the system 100 may manually select to generate visual code through a user interface of the application instead of or in addition to automatically generating a prompt when the user devices 101, 104, and 105 and the authenticating device 102 are within a predetermined distance 106.

When the biometric data matches the stored biometric data, the application may generate a temporary one-time passcode. The application may then encrypt a string including the temporary one-time passcode and user identification information. The application may generate custom visual code 107 based on the encrypted screen. In further examples, the application may use various steganography techniques to encode messages, commands, and requests into the visual code as well. For example, the custom visual code 107 may include additional encoded information. In some embodiments, this encoded data may comprise data associated with requests to the authenticating device 102 to conduct a transaction, to open a locked door, and to provide access through a security checkpoint.

The application may generate custom visual code 107 based in part on the temporary one-time passcode and the user identification information. In some examples, the application may also generate the custom visual code 107 using a timestamp from the user device or from another timekeeping source such as an official internet standard time stamp including the time and date of the custom visual code 107 generation. The custom visual code 107 may be a barcode, QR code, or another image with encoded messages such as markers. In some examples, the custom visual code 107 may be a QR code overlayed on an image of the user, such as a profile picture of the user.

The authenticating device 102 may use a camera or scanner 103 to scan the custom visual code 107 displayed on the user device 101, 104, and 105. The authenticating device 102 may indicate the user's identity is authenticated based on information received from the custom visual code 107 matches records associated with a user or the temporary one-time password. In one such example, the authenticating device 102 may decrypt the encrypted string encoded in the custom visual code 107 and compare the information to records of the user to authenticate the user's identity an additional time. For example, the authenticating device 102 may be a smart door system and may unlock after the user's identity is authenticated at the authenticating device 102. In some examples, the authenticating device 102 scans the custom visual code 107 for encoded messages indicating that the user devices 101, 104, and 105 authenticated the user's identity. The user device 101, 104, and 105 and the authenticating device 102 may authenticate the user's identity.

Figure 2:
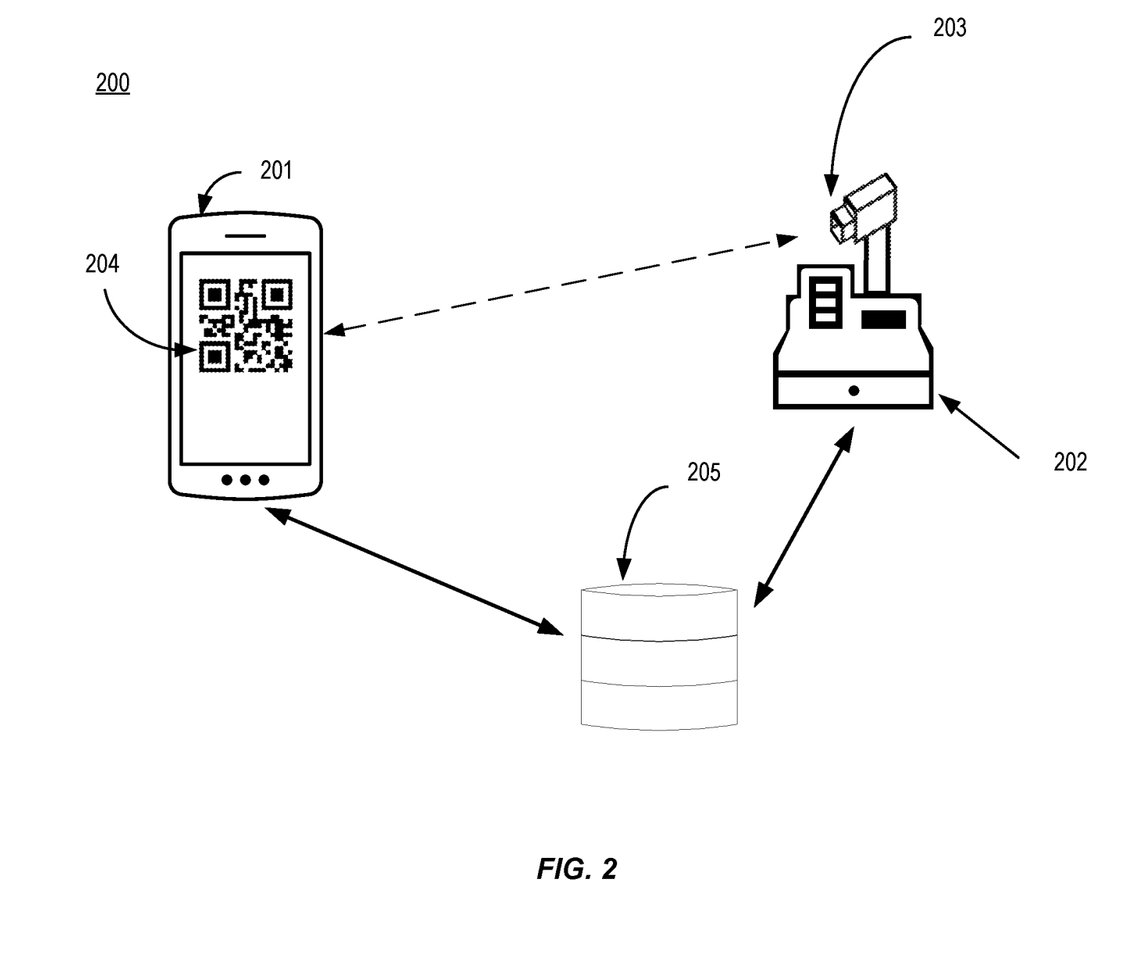
FIG. 2 illustrates an example system for authenticating user identity using a visual code according to one embodiment.

FIG. 2 illustrates another example embodiment of a system 200 for authenticating user identity using custom visual code. FIG. 2 shows a user device 201 with a display displaying visual code 204. The user device 201 may connect wirelessly to a remote database or repository 205. FIG. 2 further shows an authenticating device 202 with a camera 203. The authenticating device 202 may connect wirelessly to the remote database or repository 205.

The remote database or repository 205 may store user identification information, such as the user's username and password combination, Social Security Number (SSN), Employee Identification Number (EIN), and other information particular to a user such as an employee badge number. The remote database or repository may allow the system 200 to store the user identification information in cloud storage instead of or in addition to storing the user identification information locally on the user device 201. The remote database or repository 205 may also store the user's biometric data.

In some examples, the authenticating device 202 may connect wirelessly to the remote database or repository 205 as shown in FIG. 2. For example, the application may encrypt the temporary one-time password and user identification information. The application may generate the visual code 204 including a command for the authenticating device to request additional user identification information from the remote database or repository 205 and a command to conduct a transaction, such as requesting the user's bank account and routing number to make a purchase using the user's savings account.

Illustrative Example of a Authenticating User Identity

Figure 3:
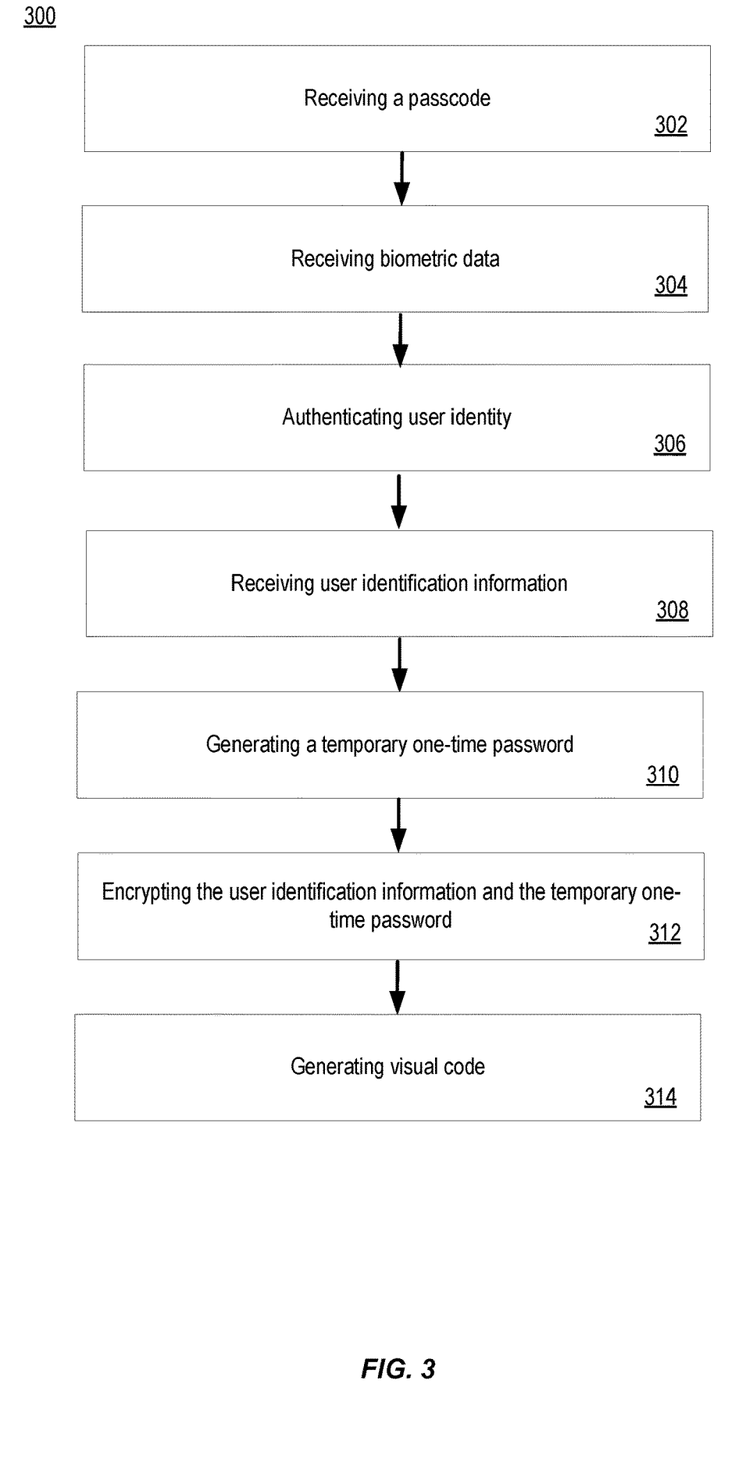
FIG. 3 illustrates a flow chart for an example method of generating a visual code according to one embodiment.
Figure 4A:
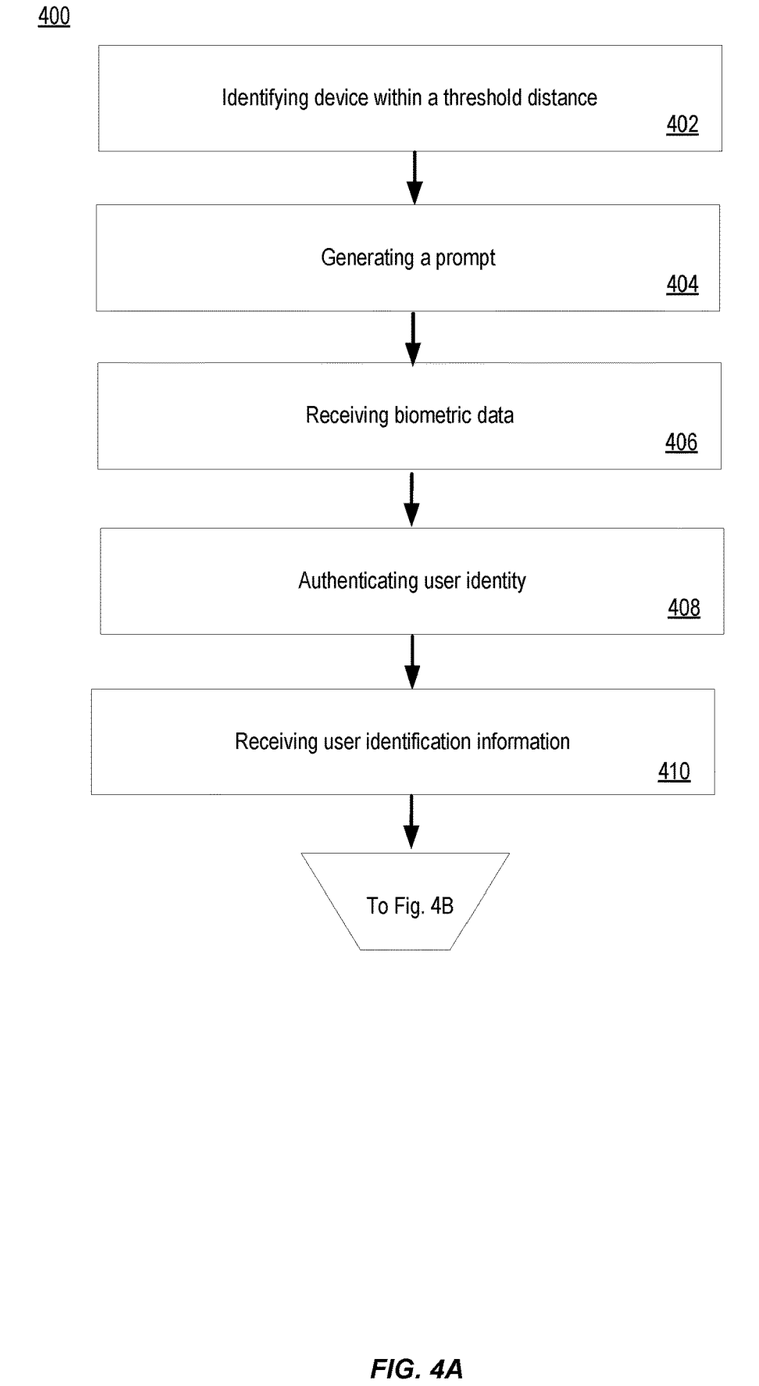
FIG. 4A and FIG. 4B illustrate a flow chart for an example method of generating a visual code using hashing.
Figure 4B:
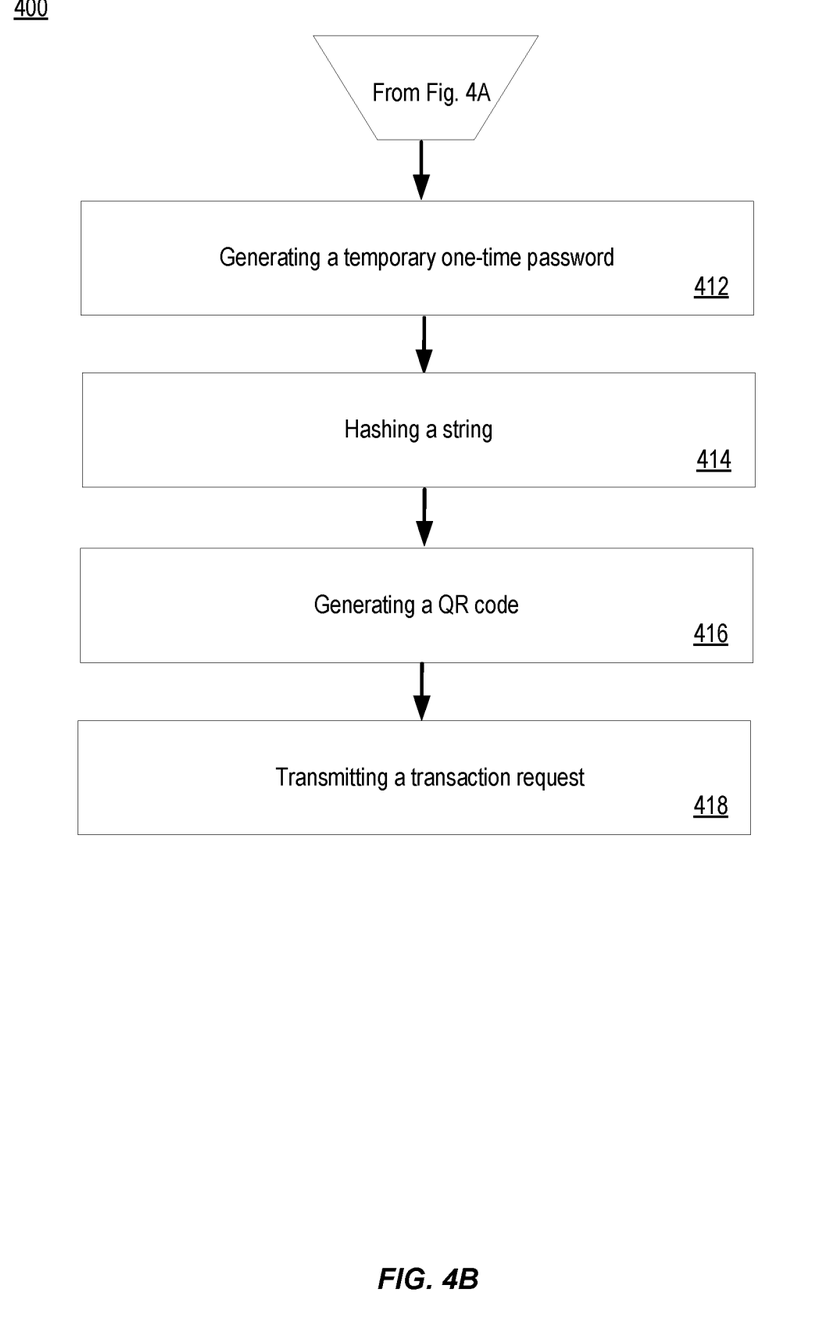

FIG. 3, FIG. 4A, and FIG. 4B are flowcharts showing illustrative methods for authenticating user identity. In some examples, some of the steps in the flow chart of FIG. 3, FIG. 4A, and FIG. 4B are implemented in program code executed by a processor, for example, the processor in a general-purpose computer, mobile device, or server. In some examples, these steps are implemented by a group of processors. In some examples the steps shown in FIG. 3, FIG. 4A, and FIG. 4B are performed in a different order or one or more steps may be skipped. Alternatively, in some examples, additional steps not shown in FIG. 3, FIG. 4A, and FIG. 4B may be performed.

At block 302 the method receives a passcode. The passcode may be a password associated with an application or the passcode for a user device. For example, the application may initially request the user input an alphanumeric passcode. The passcode may be the same passcode as a passcode used to access the user device, such as a phone screen passcode. The application may compare the user's input to a stored passcode key, and when the user's input matches the stored passcode key, the method may proceed to block 304. In some examples, the method may skip block 302 or the method may begin at block 304.

At block 304 the method receives biometric data. The biometric data may be associated with the user. Biometric data may include fingerprint, facial scan, voice recording of a password, and a palm print. The user device may include a biometric scanner such as a camera, microphone, fingerprint scanner, or palm print scanner to receive the user's biometric data as an input.

At block 306, the method authenticates the user's identity. User authentication may include comparing the received passcode and the received biometric data to a stored profile of the user including stored copies of the user's passcode and biometric data. The user may store the passcode and biometric data locally at the user device or remotely at a remote database or repository.

At block 308, the method receives user identification information. The user identification information may include various information particular to a user such as the user's Employee Identification Number (EIN), Social Security Number (SSN), username and password, bank account and routing numbers, credit and debit card information, memberships, and security clearances. In some examples, the user may store the user identification information stored locally on the device or remotely at a remote database or repository.

At block 310, the method generates a temporary one-time password. In some examples, the method includes communicating with a third-party application to generate the temporary one-time password at the third-party application or infrastructure associated with the third-party application. In other examples, the application executed on the user device may generate the temporary one-time password. The application may use a random number generator and internal clock of the user device to generate the temporary one-time passcode locally.

At block 312, the method encrypts the user identification information and the temporary one-time password. The method may encrypt the user identification information and the temporary one-time password into a string using various encryption techniques including asymmetric encryption algorithms such as Rivest-Shamir-Adleman (RSA) encryption, and symmetric encryption techniques such as Two-Fish or Advanced Encryption Standard (AES) techniques.

At block 314, the method generates visual code based in part on the encrypted user identification information and temporary one-time password. The visual code may include QR codes and barcodes. The method may use additional steganography techniques to encode messages into the visual code, such encoding commands or requests to an authenticating device scanning the visual code.

FIG. 4A and FIG. 4B illustrates an example method 400 of generating visual code using hashing.

At block 402, the method identifies an authenticating device within a threshold distance of a user device. The method may use various wireless technologies such as Bluetooth, WiFi, near-field communication, and proprietary radio-frequency (RF) signals to identify a user device and authenticating device within a threshold distance of the other. The predetermined threshold distance may vary based on the wireless technology of the user device and authenticating device.

At block 404, the method generates a prompt. The user device may display the prompt on the user device's display. The prompt may include instructions to input information or request permission to proceed with a transaction. In one example, the prompt may request the user enter an alphanumeric passcode of the user device. In some examples, the prompt may request the user input biometric data in addition to or instead of the alphanumeric passcode.

At block 406, the method receives biometric data. For example, biometric data may include a facial scan, a fingerprint, a palm print, and a voice recording of a voice password. The user device may include a biometric scanner to receive biometric information. The user device may compare the biometric information received using the biometric scanner to biometric data stored at the user device.

At block 408, the method authenticates the user's identity. When the biometric data stored at the user device substantially matches the biometric data received using the biometric scanner, the user device authenticates the user's identity. When the biometric data does not match, the user device may generate a popup error message indicating that the user is not authenticated.

At block 410, the method receives user identification information. User identification information may include any information particular to a user stored by the system at the user device or at a database. The user device may receive user identification information from a database of user information. For example, the user may have an account profile with an enterprise including various user identification information such as the user's username and password pair, Social Security Number (SSN), and Employee Identification Number (EIN).

At block 412, the method generates a temporary one-time password. The method may generate the temporary one-time password using a third-party application or may generate the temporary one-time password locally on a user device. The temporary one-time password may be an alphanumeric string generated using an algorithm that uses a random number generator and time stamp to generate a random code.

At block 414, the method hashes a string. The method may use a hashing function to determine a hash value that is represented by a string. The method may use the temporary one-time password and the user identification information as inputs to the hashing function. In some examples, the method may use portions of the user identification information and temporary one-time password as inputs to the hashing function to make calculation of the hash value easier. For example, the hashing function may use the first half of the temporary one-time password (e.g., the first five digits of a ten-digit password) when determining the hash value. The method may further include storing the hashed string in an online database or repository to associate the hashed string with a user.

At block 416, the method generates a QR code or other visual code. The method generates the QR code to include the hashed string. The method may include various steganography techniques to encode a message including the hashed string in the QR code. The authenticating device may decode the message to obtain the hashed string and compare the hashed string to a database of hashed strings to identify the user associated with the hashed string.

At block 418, the method may include transmitting a transaction request. In some examples, block 418 is combined with block 416. For example, the QR code generated at block 416 may include a transaction request. In other examples, the user device may transmit the transaction request after the authenticating device has scanned the QR code and determined that the user identity is authenticated. The transaction request may include payment for a particular good or service, such as transmitting a user's credit card information. For example, the authenticating device may be a point-of-sale system such as a cash register. The authenticating device may receive the credit card information and execute the transaction.

Example Advantages of Authenticating User Identity Using Custom Visual Code

The system for authenticating user identity using custom visual code provides the user with added protection against would-be hackers while maintaining low user experience friction. For example, the user is not inconvenienced by waiting for and inputting the temporary one-time password.

In some embodiments, the system may generate the visual code by implementing steganography into an image of the user or into a digital ID of the user. This provides the benefit of allowing both the authenticating device and a human operator to verify the user's identity. For example, because the system may include visual code in an image of the correct user, the human operator may compare the image with the visual code to the actual appearance of the user to ensure that the user matches the photo. By using steganography to conceal the visual code within an image of the user, the system also provides additional protection against would-be hackers because the hackers would have to both decode the encrypted information encoded in the visual code and decrypt the encrypted information to determine the user identification information, adding additional steps to any attempts of the hackers to identify the user identification information. Further, because the user identification information is encoded in an image using steganography, which is often not identifiable by the human eye, it would not be apparent to hackers that the image includes an encoded message. Would-be hackers would be unlikely to realize that the images include user identification information and would not attempt to identify user identification information from the image.

General Considerations

Although the subject matter has been described in language specific to structural features or methodological acts, it is to be understood that the subject matter of the appended claims is not necessarily limited to the specific features or acts described above. Rather, the specific features and acts described above are disclosed as examples.

Various operations of examples are provided herein. The order in which one or more or all of the operations are described should not be construed as to imply that these operations are necessarily order dependent. Alternative ordering will be appreciated based on this description. Further, not all operations may necessarily be present in each example provided herein.

As used in this application, "or" is intended to mean an inclusive "or" rather than an exclusive "or." Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has," "with," or variants thereof are used in either the detailed description or the claims, such terms are intended to be inclusive in a manner similar to the term "comprising".

Further, unless specified otherwise, "first," "second," or the like are not intended to imply a temporal aspect, a spatial aspect, or an ordering. Rather, such terms are merely used as identifiers, names, for features, elements, or items. For example, a first state and a second state generally correspond to state 1 and state 2 or two different or two identical states or the same state. Additionally, "comprising," "comprises," "including," "includes," or the like generally means comprising or including.

Although the disclosure has been shown and described with respect to one or more implementations, equivalent alterations and modifications will occur based on a reading and understanding of this specification and the drawings. The disclosure includes all such modifications and alterations and is limited only by the scope of the following claims.

What is claimed is:

1. A method for executing a transaction, the method comprising:
   detecting, by a user device, that the user device is within a predetermined threshold range of an authenticating device, wherein the predetermined threshold range varies based on a wireless technology of the user device and based on a wireless technology of the authenticating device;
   displaying, at the user device, a prompt requesting biometric data from a user associated with the user device;
   receiving, by the user device, the biometric data;
   determining, by the user device, user identification information based on received biometric data;
   generating, by the user device, a temporary one-time password;
   encrypting, by the user device, the user identification information and the temporary one-time password; and
   generating a visual code for display on the user device based in part on the encrypted temporary one-time password and user identification information, wherein the visual code comprises additional instructions for the authenticating device including details for executing the transaction.

2. The method of claim 1, wherein the visual code is a QR code or a barcode.

3. The method of claim 1, wherein the visual code is a QR code comprising an encoded authentication protocol.

4. The method of claim 1, wherein the user identification information is one or more of an Employee Identification Number, a Social Security Number, a username and password pair, a bank account number and routing number, credit card information, debit card information, memberships, and a security clearance.

5. The method of claim 1, wherein generating the visual code comprises combining the temporary one-time password and user identification information into a string and hashing at least a portion of the string.

6. The method of claim 1, wherein the visual code is generated based in part on one or more of an output of a random number generator, a time measurement of a user device, a location of the user device, or an image stored on the user device.

7. The method of claim 1, wherein the biometric data includes one or more of: a fingerprint, facial scan, and a voice password of a user.

8. The method of claim 1, wherein the visual code is a QR code overlayed on an image of the user.

9. The method of claim 1, wherein the visual code is a three-dimensional rendering of an object.

10. A non-transitory computer readable medium for executing a transaction comprising instructions that when executed by one or more processors cause the one or more processors to:
   detect, by a user device, that the user device is within a predetermined threshold range of an authenticating device, wherein the predetermined threshold range varies based on a wireless technology of the user device and based on a wireless technology of the authenticating device;
   display, at the user device, a prompt requesting biometric data from a user associated with the user device;
   receive, by the user device, the biometric data;
   determine, by the user device, user identification information based on received biometric data;
   generate, by the user device, a temporary one-time password;

encrypt the user identification information and the temporary one-time password; and generate a visual code for display on the user device based in part on the encrypted temporary one-time password and user identification information, wherein the visual code comprises additional instructions for the authenticating device including details for executing the transaction.

11. The non-transitory computer readable medium of claim 10, wherein the visual code is a QR code or a barcode.

12. The non-transitory computer readable medium of claim 10, wherein the visual code is a QR code comprising an encoded authentication protocol.

13. The non-transitory computer readable medium of claim 10, wherein the user identification information is one or more of an Employee Identification Number, a Social Security Number, a username and password pair, a bank account number and routing number, credit card information, debit card information, memberships, and a security clearance.

14. The non-transitory computer readable medium of claim 10, wherein generating the visual code based on the encrypted temporary one-time password and user identification information includes combining the temporary one-time password and user identification information into a string and hashing a portion of the string.

15. The non-transitory computer readable medium of claim 10, wherein the visual code is further based in part on one or more of an output of a random number generator, a time measurement of a user device, a location of the user device, or an image stored on the user device.

16. The non-transitory computer readable medium of claim 10, wherein the biometric data includes one of a fingerprint, facial scan, and a voice password of a user.

17. The non-transitory computer readable medium of claim 10, wherein the visual code is a QR code overlayed on an image of the user.

18. A system for executing a transaction, the system comprising:
one or more processors, and a memory including instructions that, when executed by the one or more processors, cause the one or more processors to:
detect a user device associated with the one or more processors is within a predetermined threshold range of an authenticating device, wherein the predetermined threshold range varies based on a wireless technology of the user device and based on a wireless technology of the authenticating device;
transmit display, at the user device, a prompt requesting biometric data from a user associated with the user device;
receive, by the user device, the biometric data;
determine, by the user device, user identification information based on received biometric data;
generate, by the user device, a temporary one-time password;
encrypt, by the user device, the user identification information and the temporary one-time password; and
generate a visual code for display on the user device based in part on the encrypted temporary one-time password and user identification information, wherein the visual code comprises additional instructions for the authenticating device including details for executing the transaction.

19. The system of claim 18, wherein the biometric data includes one of a fingerprint, facial scan, and a voice password of a user.

20. The system of claim 18, wherein the visual code is a QR code or a barcode, and wherein the user identification information is one or more of an Employee Identification Number, a Social Security Number, a username and password pair, a bank account number and routing number, credit card information, debit card information, memberships, and a security clearance.

* * * * *